Oct. 30, 1934.  I. J. VAN HUFFEL  1,978,614
ELECTRICAL WELDING APPARATUS
Filed March 2, 1934  2 Sheets-Sheet 1
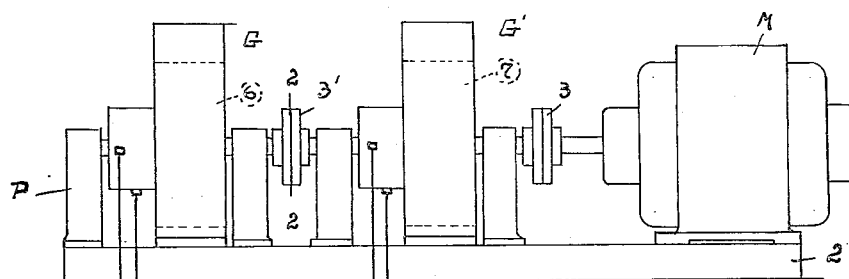
FIG. 1
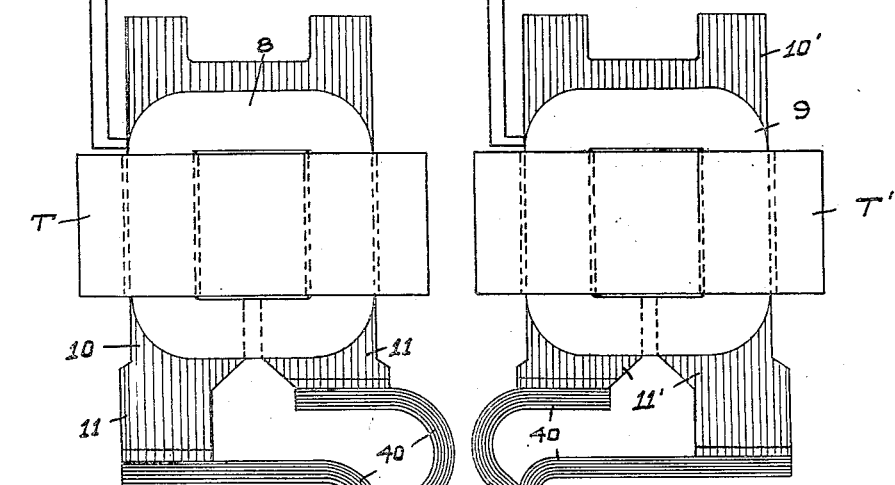
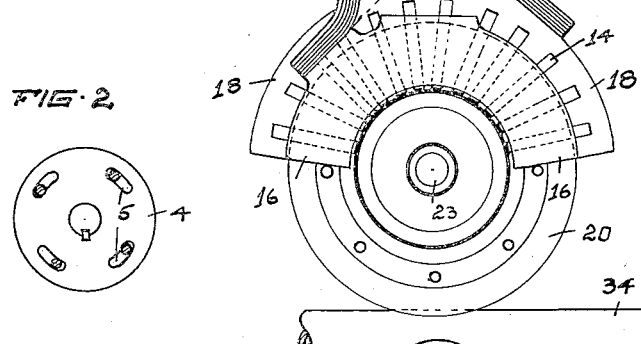
FIG. 2
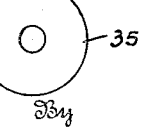
Inventor
Isadore J. Van Huffel
By Fisher, Moser & Moore
Attorneys Patented Oct. 30, 1934

1,978,614

UNITED STATES PATENT OFFICE 1,978,614

ELECTRICAL WELDING APPARATUS

Isadore J. Van Huffel, Warren, Ohio

Application March 2, 1934, Serial No. 713,718

4 Claims. (Cl. 219—4)

My invention relates to an improvement in electrical welding apparatus, such apparatus for example as the welding machine shown and described in my Patent No. 1,648,921, dated November 15, 1927. Machines of this type are designed for welding a longitudinal closed seam in a metal tube in an efficient and rapid manner and ordinarily include two transformers and two sets of definitely spaced welding electrodes adapted to simultaneously effect two interlapping spaced welds, thus producing a closed seam and a continuous weld in the finished product. However the proper spacing of the welding electrodes of these machines is difficult to obtain and necessitates the employment of very accurate and expensive adjusting means for the adjustable electrodes, as the current has a tendency to pass through the previously welded areas of the tube rather than jump the gap between these areas when the electrodes are not properly spaced.

It is the general object of my invention to provide a machine which produces interlapping welds more effectively and economically than heretofore. A further object of the invention is to provide a machine of the type referred to embodying a single set of electrodes or even a single electrode. These electrodes are coupled with two independent sources of electric current energy of suitable voltage and amperage. The welding action of the current passing from these two sources through the single set of electrodes or single electrode produces the desired closed seam and a continuous weld in the finished product.

The above and other novel objects of my invention will best be understood by reference to the following description, taken in connection with the accompanying drawings, in which:

Figure 1 is a diagrammatic showing of my improved welding machine;

Figure 2 is a sectional view through one of the coupling elements for coupling one of the generators with a motor, the section being taken on line 2—2 of Figure 1;

Figure 3:
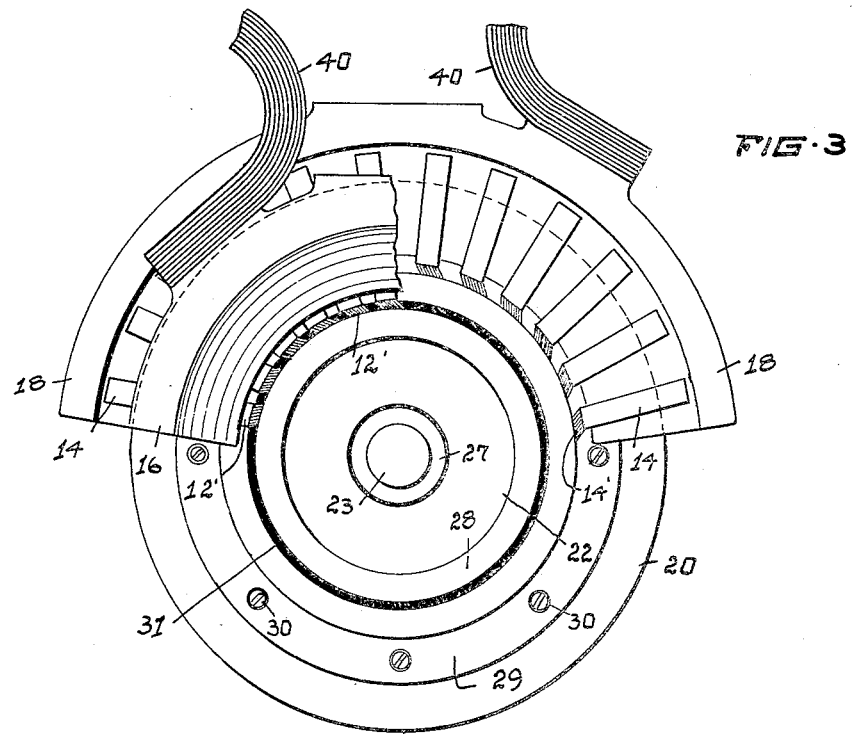
Figure 3 is an enlarged front elevation partly broken away of the annular welding electrode shown in the diagram of Figure 1.
Figure 4:
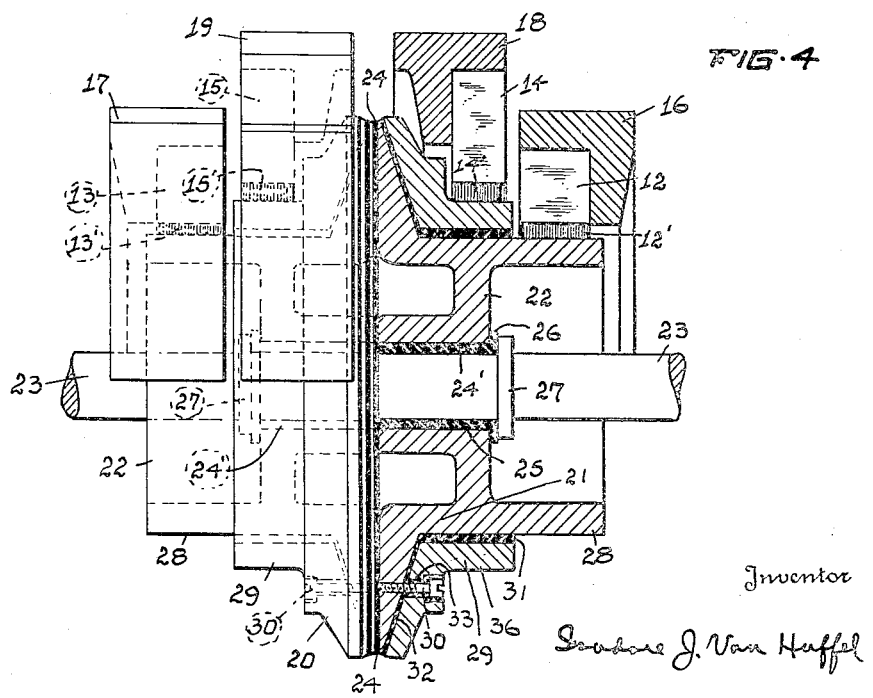
Figure 4 is an enlarged sectional view on line 4—4 of Fig. 3, one half of the annular welding electrode being shown in section and the other half in elevation.

As shown in the diagram of Figure 1, the machine embodying the present improvements includes two electric welding transformers, marked T and T' respectively. These transformers are electrically connected with two independent generators G and G' mechanically coupled with and driven by a motor M. The motor M and the generators G and G' are mounted upon a base member 2 and form a power unit P, having its motor and generators directly coupled with each other by means of coupling members 3, 3' respectively. Coupling member 3, which is of common design, couples the motor M with the generator G and coupling member 3', in turn operatively connects the two generators together. This latter coupling member embodies a slotted coupling disk 4, the slots 5 of which permit of rotary adjustment of the armature 6 of generator G, with respect to armature 7 of generator G' and therewith enables the operator to accurately control the phase difference between the respective generators. Generator G is electrically coupled with the primary winding 8 of the transformer T and generator G' with the primary winding 9 of the transformer T'. The transformers each embody a divided secondary winding 10, 10' respectively, having angular terminals 11—11' of opposite polarity. These terminals are electrically connected by flexible leads 40 with a series of electric current conducting brushes 12, 13, 14 and 15, mounted in brush holders 16, 17, 18 and 19 and contacting with a circular welding electrode 20. The welding electrode consists of a hubbed-wheel 21, embodying two symmetrical sections or halves 22, rotatably mounted for joint movement upon a shaft 23 and suitably insulated from each other and said shaft. Thus insulating material 24, is arranged between the opposed faces of said sections 22, and insulating sleeves 24', sleeved upon the shaft 23 and interposed between the shaft and the wall of a bore 25, extending centrally through the electrode 20, insulates said shaft and sections from each other. The opposite ends of the sleeves 24' are formed with flanges 26 which are tightly clamped to the respective sections of the electrode by collars 27 on the shaft 23. The hub portions 28 of the wheel 21 each support ring shaped hubbed collars 29, rigidly connected therewith by means of screws 30, and insulated therefrom by means of insulating sleeves 31 and disks 32, care being taken to also insulate the screw 30 as indicated at 33.

The central peripheral portion of the wheel 21 is grooved to snugly receive therein, with clamping pressure and rolling contact, a split tube 34, when the latter is fed between the wheel and an idler roller 35, suitably mounted directly therebeneath. Feeding of the tube may be accomplished in any suitable way not shown. The brushes 12, 13, 14 and 15 which are preferably movably supported in a vertical plane, as disclosed in my prior patent previously referred to herein, engage the hub portions 28 of the wheel 21 and the hub portions 36 of ring shaped collars 29. Thus the brushes 12 and 13 which are radially secured in the segmental recessed holders 16 and 17, contact the hub portions 28 with their lower yielding portions 12' and 13', and the lower yielding portions 14' and 15' of brushes 14 and 15, mounted in holders 18 and 19, contact with the hub portions 36 of collars 29. The brush holders 16 and 17 are coupled with the angular terminals 11 of secondary winding 10 of transformer T, and the brush holders 18 and 19 are coupled with the angular terminals 11' of secondary winding 10' of transformer T', so that the secondary windings 10 and 10' of said transformers will be short circuited through the tube during welding operations.

It is of course understood that in machines of the general type described herein, the nature of the weld depends upon the rate of feed of the stock. That is, whether a continuous weld or a series of spaced welds will be produced by means of the roller electrode through which an alternating current, say of sixty cycles, is passed. If the rate of feed is sufficiently slow naturally the periodic flow of current takes place more often in each linear foot of the stock than if the rate of feed is faster, thereby permitting a continuous weld to be produced. But if the rate of feed is too fast to permit the stock to be heated uniformly linearly of the seam a series of interrupted welds are produced and a succession of welded and unwelded areas result. Thus in operating the presently described apparatus, using the alternating current generated by the generator G and feeding the tube continuously to the electrode at a predetermined rate of speed, a series of interrupted welds may be produced at uniformly spaced intervals in the longitudinal seam of the tube by the current passing from secondary winding 10 of the transformer T and wheel 21 through the tube. At the same time the current passing from secondary winding 10' of the transformer T' and collar 29 through the tube, may also produce a series of interrupted welds at uniformly spaced intervals in the longitudinal seam of the tube. When these latter welds are produced in the gaps or spaces of the seam, partially completed by the welding effected through transformer T, the seam of the completed tube or finished product will be continuous or homogeneous throughout, thus insuring a continuous fluid-tight joint or seal capable of resisting high internal pressures. The overlapping of the two welds to form a continuous fluid-tight joint can readily be effected by shifting the phase of generator G with respect to that of generator G', made possible by the presence of slotted coupling disk 4, which permits rotary adjustment of armature 6 of generator G with respect to armature 7 of generator G'.

It will be understood that interlapping welds and a closed seam may also be obtained within the scope of my invention, by a machine embodying a single set of inclined welding electrodes, each of which is electrically connected with the individually energized transformers described herein, or by a machine embodying a plurality of spaced single, and/or sets of welding electrodes, provided the phases of the energizing sources of current for the transformers are properly timed with respect to each other.

The transformers T and T' may of course be set at an angle with respect to each other, say about forty five degrees, or they may be built in duplex in a single casting to obtain a more compact unit and thus simplifying the connection of the leads to the brushes of the welding electrodes.

Other changes or modifications may be made in the apparatus without departing from the spirit and scope of my invention.

Having thus described my invention,
What I claim is:

1. An electrical welding apparatus comprising a wheel-shaped welding electrode embodying two pairs of individual contact members adapted to contact with the work fed through the machine, a transformer for each pair of said contact members, an individual source of current for each of said transformers, and means for shifting the phase of the one of said current sources with respect to the phase of the other one.

2. An electrical welding apparatus comprising electrode means substantially of wheel shape, pairs of individual contact members on said electrode means for contacting with the work fed through the machine, a transformer for each pair of said contact members coupled therewith and adapted to send welding current through said work fed through the machine, an individual source of alternating current for each of said transformers, and means for shifting the phase of one of said current sources with respect to the phase of the other.

3. An electrical welding apparatus comprising electrode means of substantially wheel shape, pairs of individual contact members symmetrically arranged on said electrode means and insulated from each other and adapted to contact the work fed through the machine adjacent to the seam to be produced, a transformer for each pair of said contact members having its secondary winding connected therewith, an individual source of alternating current for each of said transformers, and means for shifting the phase of one of said current sources with respect to the phase of the other.

4. An electrical welding apparatus comprising electrode means of substantially wheel shape, pairs of individual contact members symmetrically arranged on said electrode means and insulated from each other and adapted to contact the work fed through the machine adjacent to the seam to be produced, a transformer for each pair of said contact members having its secondary winding connected therewith, and an alternating current power plant for said transformers, said power plant including individual generators, and a motor for driving said generators and means coupling said motor with said generators, one of said coupling means being rotatably adjustable to permit shifting of the phase of one generator with respect to the phase of the other.

ISADORE J. VAN HUFFEL.